United States Patent [19]
Damour

[11] 3,937,412
[45] Feb. 10, 1976

[54] EXPANDING OUTER SLEEVE FOR A MANDREL OR CHUCK

[76] Inventor: Lawrence R. Damour, 16 Chesler Square, Succasunna, N.J. 07876

[22] Filed: Apr. 23, 1975

[21] Appl. No.: 570,562

[52] U.S. Cl. .............................................. 242/72 B
[51] Int. Cl.² ......................................... B65H 75/18
[58] Field of Search ............ 242/72 B; 279/2; 82/44; 269/48.1

[56]  References Cited
UNITED STATES PATENTS

| | | | |
|---|---|---|---|
| 3,273,817 | 9/1966 | Damiron | 242/72 B |
| 3,825,167 | 7/1974 | Komorek | 242/72 B |
| 3,863,857 | 2/1975 | Smith | 242/72 B |

*Primary Examiner*—Edward J. McCarthy
*Attorney, Agent, or Firm*—Ralph R. Roberts

[57] ABSTRACT

This invention pertains to a segmented expanding sleeve for an expanding mandrel or chuck in which air or hydraulic fluid is fed to and into a resilient tube or tubes arranged in a longitudinal or in a helical manner. This tube or these tubes are carried by and in grooves formed in the body and when pressurized air or fluid is fed into the tube means the tube or tubes are expanded in a controlled manner to outwardly move a plurality of like-linked leaf members or segments. Each leaf member has one longitudinal edge formed with a keyhole-type groove and the other edge of each leaf is formed with a tongue member having an enlarged outer portion. In an assembled condition the tongue member of one leaf is mounted in the keyhole groove of the next adjacent leaf and these tongue and groove arrangements provide an outer limit to the expansion. Resilient inner tying members extend between leaf members and retain and draw the leaf members into an inner limit against the body of the chuck. Usually one or more of these leaf members are mounted on pins carried in the body. These pins transmit the torque from the outer leaf members to the core member and vice versa.

10 Claims, 6 Drawing Figures

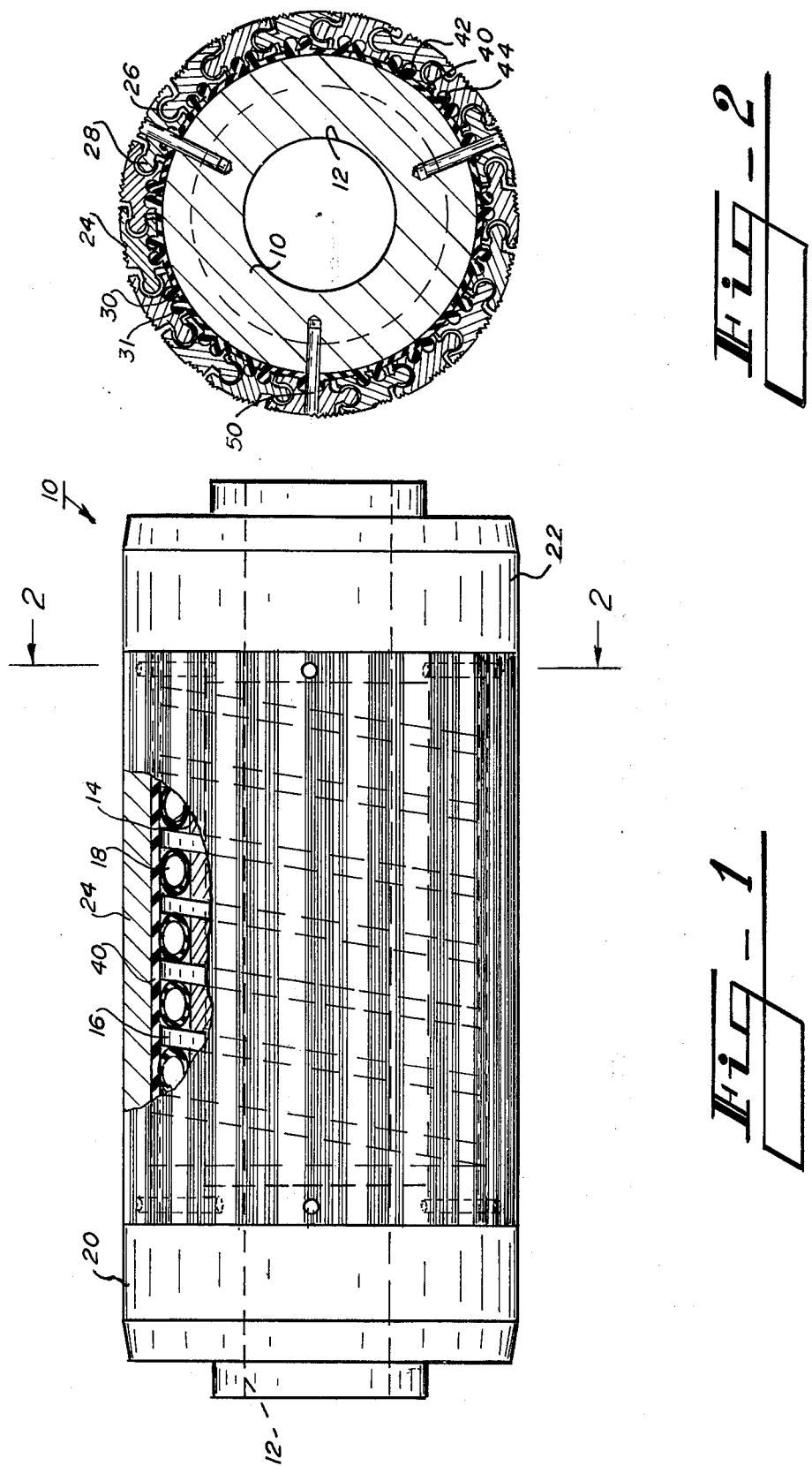

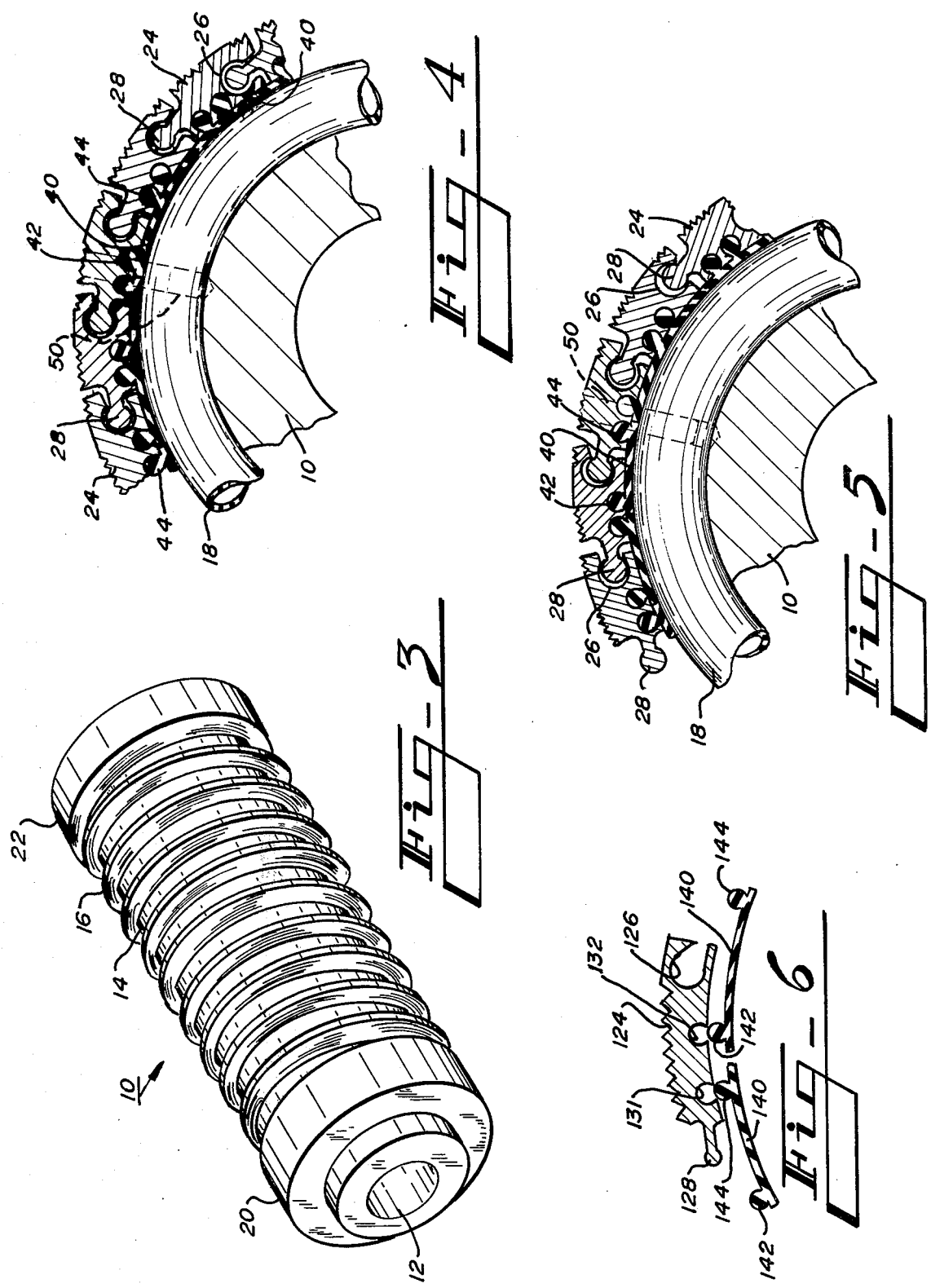

EXPANDING OUTER SLEEVE FOR A MANDREL OR CHUCK

CROSS REFERENCE TO RELATED PATENT APPLICATIONS AND/OR PATENTS

To the extent applicable the present invention contains information as shown in U.S. Pat. No. 3,825,167 as issued on Mar. 23, 1974 and in U.S. Pat. No. 3,917,187 which was filed on July 12, 1974 as my application Ser. No. 488,160.

BACKGROUND OF THE INVENTION

1. Field of the Invention

With reference to the classification of art as established in the U.S. Patent Office, this invention pertains to the general Class of "Winding and Reeling" (Class 242) and more particularly to the subclass of "contractible or expansible — with inflatable means" (subclass 72B).

2. Description of the Prior Art

Expanding chucks and mandrels are, of course, well known in the art and in particular expanding mandrels or chucks which use hydraulic fluid or air to expand segments. Such a device is particularly shown and described in my U.S. Pat. No. 3,825,167 and in U.S. Pat. application Ser. No. 488,160 as filed on July 12, 1974 and now U.S. Pat. No. 3,917,187. Many expanding mandrels and chucks have the expanding leaf members retained by one or more fixed members. In my application Ser. No. 488,160, above identified, an attempt has been made and actually has been achieved in which the complete peripheral surface providing the carrying and driving portion of the expanding mandrel or chuck are outwardly and inwardly moving leaf segments longitudinally arranged. However, it has been found that leaf segments so arranged usually occupy either one-third or one-fourth of the circumference and, hence, are limited in the range of sizes for the mandrels used. For most mandrels the leaf segments must be manufactured to accommodate a particular size of mandrel of chuck. Such a design, although effective, has required an extensive outlay of material since a multiplicity of sizes is required to service industry. In the expanding mandrel or chuck shown in Ser. No. 488,160 it is also required that in order to derive an equal pressure on the expanding leafs the tube must be helically wound. In the present invention both a helically wound tubing or a longitudinally arranged tubing may be utilized. The interlocked, longitudinal segments which are a series of like metal extrusions are simply cut to length from a long extrusion length. The contemplated longitudinal segments, as reduced to practice, have a pitch length of one-sixteenth pi, one eighth pi or one-quarter pi. In this way mandrel diameters up to one inch may be provided in increments of 1/16 inch on diameter by using segments which are one-sixteenth of pi (0.196 inches). Mandrels from one inch to two and seven-eighths diameter employing segments that are one-eighth pi (0.393 inches and from three inches up diameter, one-quarter pi segments (0.785 inches). As formed, leaf segments have one longitudinal edge formed as a tongue with an enlarged rounded end. The other edge is formed with an arcuate T-groove. The undersurface portion of each of the longitudinal segments is provided with two longitudinal grooves in which protruding portions of rubber strips are fitted. These mounted rubber strips act as tension members and also as a chafing strip and resilient cushion for protecting the tubing which is mounted in the grooves as the expanded tubing is pushed outwardly against the leaf members.

SUMMARY OF THE INVENTION

This invention may be summarized at least in part with reference to its objects.

It is an object of this invention to provide, and it does provide, an outer drive sleeve for expanding mandrels or chucks which by increasing or decreasing the multiplicity of like outer leaf members provides an assembly which accommodates a given range of sizes. Each like leaf has a tongue member formed along one edge of the leaf and a mating receiving groove along the other edge of the leaf. The underside of each leaf member has at least two longitudinal grooves providing retaining means in which tongue portions of rubber understrips are mounted. These rubber understrips provide tension means to draw the leaf members to and toward the body of the mandrel. The torque transmitted to and from the outer expanded sleeve may be transmitted to the body by one or more pins passing through the leaf member and into the body.

It is a further object of this invention to provide an outer drive sleeve for an expanding mandrel or chuck in which a plurality of like leaf members is serially connected at its edges in a tongue and groove arrangement with a small amount of play provided in this joining means for expansion. The like leaf segments are formed so that their connected pitch length is either one-sixteenth, one-eighth or one-quarter of pi times one inch. All leaf members of this sleeve are expanded to engage and support the core or spool being driven. The expanded sleeve provides the complete peripheral drive and support surface.

In brief, the expanding mandrel or chuck includes an outer drive sleeve composed of a plurality of like leaf segments. These leaf segments are preferably extruded metal members cut to a desired length. The pitch length of the segments are preferably made as a fraction of pi times one inch, ie. one-sixteenth, one-eighth and one-quarter pi times one inch. A tongue member is formed along one edge, this tongue has an enlarged outer end of circular cross section. The other edge of the leaf member has a retaining groove with its inner portion enlarged to receive and retain the enlarged circular edge portion of the tongue member of a connected adjacent leaf. Each leaf has two grooves extending longitudinally along its undersurface. In these grooves are mounted tongue portions of rubber strips. These strips provide tension means by which the attached leaf members are drawn toward and to the body of the mandrel. The mandrel may employ either one helically wound tube or one or more longitudinally arranged resilient tubes which are inflated to achieve expansion of the drive sleeve.

In addition to the above summary the following disclosure is detailed to insure adequacy and aid in understanding of the invention. This disclosure, however, is not intended to cover each new inventive concept therein no matter how it may later be disguised by variations in form or additions of further improvements. For this reason there has been chosen a specific embodiment of the expanding outer drive sleeve employing like leaf segments serially connected with tongue and groove edges and having rubber strips to provide tension to draw the strips to a retracted condition. These strips are adopted for multiple assembly and showing a preferred means for assembly and operation.

This specific embodiment has been chosen for the purposes of illustration and description as shown in the accompanying drawings wherein:

BRIEF DESCRIPTION OF THE DRAWINGS

FIG. 1 represents a side view of a typical expanding mandrel with a portion broken away and shown in section to show a preferred construction of the expanding sleeve;

FIG. 2 represents a sectional view taken on the line 2—2 of FIG. 1;

FIG. 3 represents an isometric view of a body member in which the groove for the tubing is a spiral groove;

FIG. 4 represents a fragmentary enlarged view showing a portion of the body tubing and a portion of the outer expansible sleeve drive with this drive sleeve in its unexpanded condition;

FIG. 5 represents a fragmentary enlarged sectional view of FIG. 4 with the tubing expanded to push the outer drive sleeve to its expanded condition, and FIG. 6 represents a sectional view of a typical outer drive sleeve leaf, which leaf extrusion and rubber tension members have a longer pitch length than the sleeve members shown in FIGS. 4 and 5.

In the following description and in the claims various details are identified by specific names for convenience. These names, however, are intended to be generic in their application. Corresponding reference characters refer to like members throughout the figures of the drawings.

The drawings accompanying this specification disclose certain details of construction for the purpose of explanation but it should be understood that structural details may be modified without departure from the concept of the invention and that the expanding outer sleeve may be incorporated in other forms than shown.

Description of the Preferred Embodiment of FIGS. 1 through 5

Referring now to the drawings and in particular to FIGS. 1 through 5 there is seen a member body 10 having a through supporting bore 12 which may be mounted upon a shaft, not shown. This body 10 is depicted in FIGS. 1 and 3 as having a helical groove 14 between which is provided supporting ribs or walls 16. In this groove 14 is carried a rubber tubing 18. The body 10 has enlarged end portions 20 and 22. The expanding portion of the outer sleeve or drive portion of this expanding mandrel extends between end portions 20 and 22 and includes a series of leaf members 24. These leaf members have one edge formed with a retaining groove having an enlarged arcuate undercut 26 which opens to the side. The other edge of the leaf is formed with an extending tongue 28. The tongue has an enlarged outer edge which is substantially circular in cross section. In an assembled condition the tongue 28 of one leaf is mounted in the groove 26 of the next adjacent leaf. The underside of leaf member 24 has two longitudinal grooves and as depicted each is substantially a circular configuration with a slightly reduced entryway which is open at the underside. These grooves are identified as 30 and 31. Extending between the groove 30 of one leaf and the groove 31 of an adjacent leaf is rubber expanding member 40. Each rubber member 40 has upwardly extending circular tab members 42 and 44. Tabs 42 and 44 are mounted in grooves 30 and 31 to cause a tension to be applied by the rubber member to draw the leaf members toward each other. To transmit the torque to and from the body 10 to the outer leaf members there is provided one or more drive pins 50 which drive pins are preferably a tight fit in the leaf member 24 and are a sliding fit in the body member 10 although a reverse fit arrangement may be provided.

Alternate Construction of a Leaf Member and Rubber Retaining Member as seen in FIG. 6

Referring next and finally to FIG. 6, there is shown an alternate configuration of a leaf and rubber retaining member. Leaf member 124 shown is very much like leaf member 24, above described, but is made with a longer pitch length. Tongue 128 is made a little longer than tongue 28 and in a like manner groove 126 is made to accommodate the longer tongue 128. The rubber strip 140 is also longer and the tab portions 142 and 144 are made to slide into and be retained by the grooves 131 and 132 formed in the underside of the leaf 124.

Use and Operation of the Expanding Sleeve Assembly

The expanding sleeve of this invention utilizes interconnected leaf segments of like configuration. Preferably these segments are made as fractional increments of pi so that by utilizing a multiplicity of segments of like size an established size range is provided. By adding or subtracting a leaf very close steps in diametrical increments are available. For example, assuming that the expanding sleeve of FIGS. 1 and 2 are shown in an enlarged size and that the pitch length of one leaf segment is one-sixteenth of pi times one inch, the resulting pitch length is 0.196 inches and this provides a diametrical incremental change of one sixteenth of an inch for each leaf added or subtracted. If the shaft diameter desired is to be one-half inch minimum then eight leaf segments are used. These eight segments, with the pre-established play in the tongue and groove, when expanded accommodate all core sizes from one-half to nine-sixteenths of an inch or a slight amount more. If the next desired size diameter is nine-sixteenths of an inch, nine segments would be utilized. A contemplated maximum of sixteen segments are utilized to provide a one inch mandrel. To reduce the number of segments and change the curvature of the leaf, mandrels from one inch to two and seven-eighths inches in diameter are contemplated and the pitch length of the extrusions will be one-eighth of pi or 0.393 inches in pitch length. For a given diameter it is only necessary to divide the diameter by one-eighth to get the number of leaf members required. For example, if a two inch diameter mandrel was desired then the two inches would be divided by one-eighth resulting in a use of sixteen leaf segments. In a like manner, when the diameter of the mandrel is three inches or greater it is anticipated that the pitch length of the leaf member will be one-quarter times pi, times one inch, or a pitch length of approximately 0.785 inches. For example, if the expanding mandrel is to be three and one-half inches in diameter then the three and one-half inches are divided by one-quarter with a resulting fourteen leaf segments required for the expanding sleeve portion.

It is, of course, not necessary that the segments be a precise fraction of pi since other pitch lengths may be utilized. However, this utilization of pi times one inch divided by one-quarter, one-eighth or one sixteenth gives a ready means for providing mandrel size changes in either sixteenths, eighths or quarter inch on diameter.

From a practical viewpoint, it is assumed that the leaf member is an extrusion of metal or semirigid plastic which conventionally has a longitudinal, outwardly facing, tooth profile portion to give a biting or engaging action where desired. One longitudinal edge of the leaf has the extending tongue portion portion 28 formed with an enlarged outer edge having a circular cross-sectional portion. The other edge is made with a groove portion which has a reduced outer entranceway which retains the enlarged portion of the tongue. The enlarged inner portion of the groove is formed with a sufficient clearance so that the tongue will have twenty- to thirty-thousandths of an inch or more play when mounted in the groove 26.

In order to urge and draw the serially connected segments to their minimum diameter rubber tension strips 40 are employed. On these strips the extending tabs 42 and 44 are made to slidably mount in the undergrooves of the leaf members. The rubber strips extend from one leaf member to the next leaf member so as to bridge the gap or space between the adjacent leaf members. In its mounted condition each rubber member is stretched a small degree so as to provide a determined tension to urge the leaf members together.

Whether the body 10 has a spiral groove or whether it has a longitudinal groove or a combination thereof is really of no consequence. The outer expanding sleeve combination requires no fixed guide and retaining means for the leaf. A full outer expansion is achieved with nearly any tube arrangement and the force applied results in a sleeve that is more-or-less self-centering. The pins 50 are contemplated to provide the torque drive, as shown in FIG. 2. These pins may be a slide fit in holes formed in the body 10. When this occurs the pins are made a tight fit in the leaf member and in the portion of rubber through which they pass. As a tight fit, the pins are prevented from falling out as the expanded mandrel is opened and closed. It is to be noted that the inner rubber member, in addition to providing the biasing means to draw the leaf members together, also acts as a chafing strip to prevent the unwanted wear and pinching of the rubber tubing 18 as it is expanded to move the leaf segments outwardly.

To provide the desired expanding outer sleeve in a size range from one-half inch to sizes greater than six inches it is contemplated that this size range will be provided using only three extrusions and three rubber strips which are also made by an extrusion process. The length of the leaf segments of the mandrel is determined according to the requirements of the installation and the body member 10 is also made accordingly. After the length of the leaf members is determined they are cut from a stock of extrusions. They are then connected by sliding the tongue of one leaf into the groove of an adjacent leaf and when the desired number of leaf members have been assembled the desired tubular assembly is provided. The rubber strips are then slid into the undergrooves and by these strips the mandrel is drawn tightly together. With the tubing 18 deflated this outer expanding mandrel sleeve with the rubber tennsion members in place is then slid into place onto the body 10. The torque to be transmitted is determined and accordingly the needed several pins 50 are then inserted through the holes in the selected sleeve and into the body 10. If the torque to be transmitted is light, it is possible that the use of the pins 50 may be eliminated. This occurs because the expansion of the rubber tube provides a friction of the tube to the rubber sleeve strips. This friction is then used to transmit or transfer the torque to and from the tubing 18 which is retained in the grooves of the body to the tension strips.

The simplicity of the present invention provides many advantages in the expanding mandrel art. Like leaf segments and like rubber tension members may be stored in long lengths until a requirement for an expanding mandrel using this particular size leaf member and rubber member is received. At that time the body is made. The body, of course, is a simple unit to provide and may be readily machined by a lathe and/or milling machine. In this manner the time required to produce an expanding mandrel from stock parts as well as the cost is greatly reduced.

It is to be noted that the rubber tension members may have their tab portions arranged so that two end tabs of adjacent rubber members may mate and be mounted in a single undergroove provided in a leaf member. This arrangement may be particularly desirable on the leaf member based on the one-sixteenth fractional part of pi. The arrangement of the rubber tension member and the underside grooves lend themselves to many arrangements and it is only necessary that the outer leaf member assembly be urged to its minimum diameter and against this bias the expanding tube moves the leaf members outwardly. The leaf member may or may not have an outwardly directed tooth profile depending upon its intended use. Leaf member having both tooth and smooth surfaces are commercially used. Modifications of the tooth, when used, may be made to accommodate particular spool or core requirements.

Terms such as "left," "right," "bottom," "top," "front," "back," "in," "out" and the like are applicable to the embodiments shown and described in conjunction with the drawings. These terms are merely for the purposes of description and do not necessarily apply to the position in which the leaf members and associated rubber tension members may be constructed or used.

While a particular embodiment of this expanding sleeve has been shown and described it is to be understood the invention is not limited thereto and protection is sought to the broadest extent the prior art allows.

What is claimed is:

1. A circumferential sleeve assembly which is mounted in and on an expanding mandrel, spool shaft and the like and which provides a core support for said mandrel, and in which the expansion means for the sleeve assembly is at least one resilient tube carried by a body member and in which there is provided means for selectively feeding and releasing air, fluid and the like from said resilient tube, said mandrel and sleeve assembly including: (a) a body member; (b) at least one resilient tube carried in and by said body member; (c) end member means carried by said body member, said end member means providing confining limits for the tubing and also establishing the overall length of the body member; (d) a circumferential sleeve assembly carried by the body member and between the limits established by the confining end members, this sleeve assembly further including; (d1) a multiplicity of serially connected leaf members, each leaf member having one longitudinal edge formed as a tongue whose outer portion is enlarged to provide a greater thickness than the portion connecting the tongue to the leaf member, and with the other longitudinal edge of the leaf member formed with a retaining groove whose outer entryway is narrower than the enlarged outer portion of the tongue, said entryway freely passing said connecting portion of the tongue, the resulting assembly of a tongue of one leaf member into a retaining groove of an adjacent leaf member providing a retention of the tongue in the groove with the capturing of the enlarged portion preventing dislodgement while providing a determined amount of play, this assembled tongue in a groove permitting limited movement of adjacent leaf members toward and away from each other; each leaf member also having at least one undergroove formed therein and extending with the longitudinal extent of the leaf member, said undergroove disposed to extend inwardly from the undersurface of the leaf member when the leaf member is in an assembled condition, and (d2) a multiplicity of elastic tension member strips, each having a base portion and from this base portion there is integrally attached extending tab portions which are shaped and sized for retentive mounting in the undergrooves of the leaf members, said elastic strips in a mounted condition extending from one leaf member to an adjacent member with one of the tabs in the undergroove of one leaf member and the other tab in an undergroove of an adjacent leaf member, said elastic tension member when in mounted condition being slightly stretched so as to draw toward each other the leaf members to which they are secured, the connected leaf members of a sleeve assembly being positioned over the resilient tube so that when said tube is expanded the leaf members are urged outwardly by the expansion of the tube and with an outward diametrical limit being established by the play of the tongue in the groove, and when the pressure in the tube is decreased the stretched elastic tension members draw the leaf members toward and to the body member.

2. A circumferential sleeve assembly as in claim 1 in which each leaf member has two undergrooves each of which has its entryway through that inner surface supported by the body member and with the width of this entryway being narrower than at least a portion of the interior of the undergroove.

3. A circumferential sleeve assembly as in claim 1 in which the tongue formed along the longitudinal edge of the leaf member has the enlarged portion formed as a somewhat circular cross section, and in which the retaining groove in and along the opposite longitudinal edge is formed with an enlarged and larger recess having a somewhat circular cross section which is similar and compatible with the enlarged portion of the tongue.

4. A circumferential sleeve assembly as in claim 1 in which at least a portion of the exterior surface of the leaf member is formed with serrations providing toothlike projections adapted to engage the inside surface of a core mounted thereon, this engagement of the toothlike projections occurring as and when the expanding of the sleeve assembly is made.

5. A circumferential sleeve assembly as in claim 1 in which grooves are formed in the body member, said grooves providing retaining and positioning means for that portion of the resilient tube which is inflated to cause the leaf members to be moved outwardly.

6. A circumferential sleeve assembly as in claim 5 in which the torque to and from the leaf members is derived from operations on a workpiece carried on said mandrel, said torque being transmitted from and transferred to the body member by pins which pass through snugly fitting holes in the leaf members and into snugly fitting holes in the body member, the pins being placed so as to avoid engagement with and damage to the resilient tube.

7. A circumferential sleeve assembly as in claim 5 in which the elastic tension members when in mounted condition in the undergrooves of the leaf members as well as providing the desired tension to urge these leaf members toward each other also provide a buffer sheath which is a substantially complete tubular sleeve-like member disposed between the outwardly facing surface of the resilient tube and the undersurface of the leaf members.

8. A circumferential sleeve assembly as in claim 1 in which the effective width of the assembled leaf member is one-sixteenth pi times one inch, this leaf member also having a curve adapted for a core whose inner diameter is generally one inch or less in diameter.

9. A circumferential sleeve assembly as in claim 1 in which the effective width of the assembled leaf member is one-eighth pi times one inch, this leaf member also having a curve adapted for a core whose inner diameter is generally from one to three inches in diameter.

10. A circumferential sleeve assembly as in claim 1 in which the effective width of the assembled leaf member is one-quarter pi times one inch, this leaf member also having a curve adapted for a core whose inner diameter is generally greater than three inches.

* * * * *